United States Patent [19]

Herb et al.

[11] 4,103,414

[45] Aug. 1, 1978

[54] MACHINE TOOL WITH AT LEAST ONE TOOL MAGAZINE

[75] Inventors: Eugen Herb, Ditzingen; Erich Brekle, Benningen, both of Germany

[73] Assignee: Trumpf Maschinen AG, Switzerland

[21] Appl. No.: 694,604

[22] Filed: Jun. 10, 1976

[30] Foreign Application Priority Data

Jun. 14, 1975 [DE] Fed. Rep. of Germany .......................... 2526764

[51] Int. Cl.² ...................... B23D 27/00; B23Q 3/155
[52] U.S. Cl. ........................................ 29/568; 83/552; 83/563
[58] Field of Search ................. 29/568, 26 A; 83/549, 83/552, 563

[56] References Cited

U.S. PATENT DOCUMENTS

| 3,662,442 | 5/1972 | Noa ...................................... 29/26 A |
| 3,727,442 | 4/1973 | Ridgway et al. ................... 29/568 X |
| 3,816,904 | 6/1974 | Herb ....................................... 29/568 |

*Primary Examiner*—Othell M. Simpson
*Assistant Examiner*—Z. R. Bilinsky
*Attorney, Agent, or Firm*—McGlew and Tuttle

[57] ABSTRACT

A stamping or nibbling machine has upper and lower tool carriers, upper and lower tool magazines arranged respectively above and below the displacement range of a workpiece and rotatable about an axis of rotation which is substantially parallel to the longitudinal axis of movement of a male die in the upper tool carrier, tool carriers in each magazine, and a tool exchanger operable to move a tool from each magazine into a tool carrier and vice versa. All the tools in each magazine, except the tool to be exchanged, are arranged completely above and/or below the displacement range of the workpiece, and the tool to be exchanged is lifted by a lifting device, relative to its magazine, into a transfer plane for movement into the working position in the machine. All the tools in each magazine, except the tool to be exchanged, are covered by a cover plate , and the plates define the boundaries of the displacement plane of the workpiece and prevent engagement of the workpiece with tools in the magazines. At least the lower tool magazine has pivotaly mounted tool holders which extend radially from the axis of rotation of the magazine, and a wedge surface is provided for the tool holders, and forms a lifting device, this wedge surface being arranged at a position associated with the tool carrier of the machine tool.

7 Claims, 2 Drawing Figures

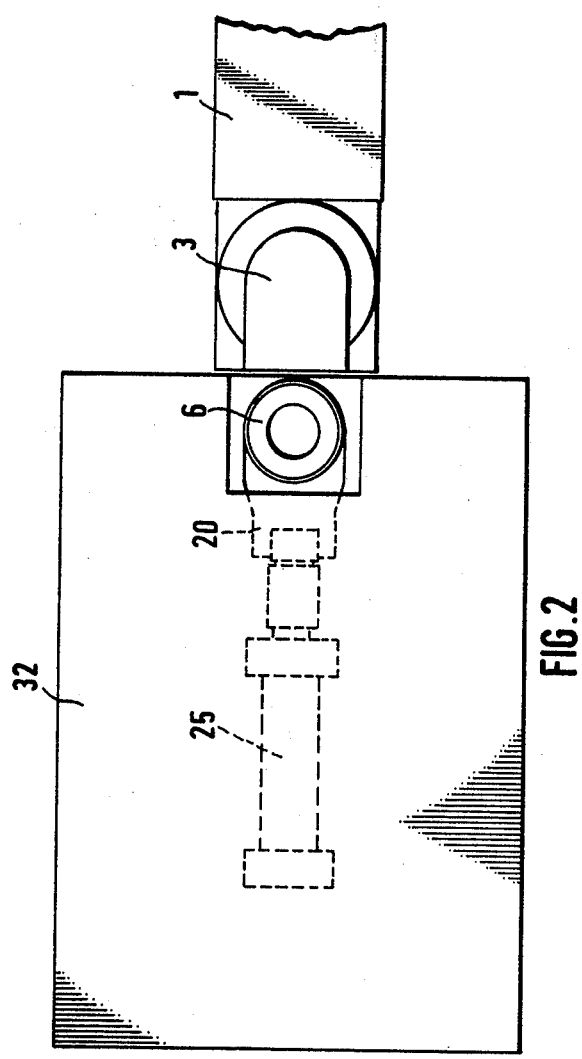

MACHINE TOOL WITH AT LEAST ONE TOOL MAGAZINE

FIELD AND BACKGROUND OF THE INVENTION

This invention relates to a machine tool, particularly a stamping or nibbling machine, with at least one tool magazine arranged above or below the displacement plane of the workpiece. The tool magazine is rotatable about an axis of rotation which extends substantially parallel to the longitudinal axis of the tool in the machine or to the longitudinal direction of movement of the male die.

A known stamping machine has rotatable tool magazines both above and below the displacement plane or range of the workpiece, which normally consists of a sheet metal plate, with the upper magazine receiving the male dies and the lower magazine the respective female dies. The lower magazine, whose axis of rotation is parallel to the working direction of the male die, is so arranged that the upper ends of the female dies extend up to the displacement plane or range of the workpiece.

As a result, the workpiece bears on these female dies of the lower magazine. Particularly in the case of an open-worked workpiece, with a reduced bending resistance, it can happen that the workpiece is hooked or engaged with one or more female dies and consequently can no longer be displaced. Additionally, the female dies can be damaged, or at least fouled, solely, by the movement of the workpiece. On the other hand, however, the workpiece must assume a predetermined position, in a vertical sense, for transfer into the machine tool or for take-over by the machine tool, and this predetermined position corresponds to the above-mentioned position of the female dies and to an equivalent position of the respective male dies.

SUMMARY OF THE INVENTION

The objective of the present invention is to provide a machine tool of the mentioned type, but where contact of the workpiece with the tool in the magazine or magazines is avoided, but where nevertheless the tool to be exchanged assumes the position necessary for the exchange.

To solve this problem, all the tools in each magazine, except the tool to be exchanged, are arranged in a plane which is completely spaced from the displacement plane of the workpiece, and the tool to be exchanged is moved, relative to its magazine, into a tool transfer plane for movement into a working position in a tool carrier and the tool extracted from the tool carrier is moved from the transfer plane into the mounting plane of the other tools in the associated magazine.

If the machine tool has only a lower tool magazine, the latter is arranged so low that the tools arranged thereon in tool holders are completely below the displacement range or plane of the workpiece, that is, they neither protrude into the displacement range of the workpiece nor are they flush with its lower surface. In this way, contact of the workpiece with a tool arranged on the lower magazine is avoided. To make sure that the tool to be exchanged, which is arranged too low for the changing operation, can still be exchanged, a lifting device is provided which lifts the tool to the desired height before the tool is exchanged by movement into the machine. This also holds true for the extraction of the used tool from the machine. After the take-over by the changing device, the used tool is lowered, by means of the lifting device, to the level of the other tools in the lower magazine.

In the case of a machine tool having an upper tool magazine, the foregoing considerations apply correspondingly. The tools of the upper magazine are arranged so high that they are not flush with the displacement range of the workpiece and naturally do not extend into the displacement range or plane of the workpiece. For exchange, these tools are detached from the magazine in the corresponding rotary position of the latter, that is, they are lowered. If the machine tool is a stamping or nibbling machine, both an upper tool magazine and a lower tool magazine are provided. If one imagines such a machine as tipped through 90°, so that the displacement plane of the workpiece is substantially vertical, the present invention can still be realized but the terms "above" and "below" are replaced by "laterally to the left" or "laterally to the right".

In a preferred embodiment of the invention, the tools or tool parts remaining in each magazine are covered by respective plates. The workpiece can rest on the lower plate during machining, while an upper plate offers protection in case the workpiece bends upwards in the machine tool during machining. The plate thus covers only the tools in the magazine and which are not in the tool exchange position, while the single tool in an angular position suitable for lifting is not covered by the plate. This tool must rather be in a position which is at least flush with the exterior surface of the plate when the tool is transferred into the tool carrier of the machine or is extracted from a tool carrier. Naturally, the plate must not protrude into the displacement range of the workpiece, but serves as a limit for movement of the latter upwardly and downwardly. It will be readily understood that the plate or plates simultaneously form a supporting table or a part of the supporting table for the workpiece to be machined.

In a further development of the invention, the magazine has pivotally mounted tool holders extending, from the horizontally oriented pivot axes, radially relative to the axis of rotation of the magazine. The pivot axes are so arranged that each holder is so designed that the tool arranged thereon is in the position in which it is spaced from the range of displacement of the workpiece, being lowered, in the case of the lower magazine, and being raised, in the case of the upper tool magazine. Since the tool holders of each magazine are pivotally mounted at their inner ends, the tool holders, and the respective tools arranged thereon, assume an inclined position except when the tool holders are in the transfer or exchange position. In the transfer or exchange position, the orientation of the tool is horizontal, so that it can be moved, by a suitable tool exchanger or tool transfer device, merely laterally into the tool carrier of the machine tool, and this holds true for the removal of a tool, such as a die, from a tool carrier of the machine. It should be mentioned that the female die and the male die are considered, in the present case, as separate tools, although both together form "the tool" in ordinary machine tool usage.

In another development of the invention, a stop surface, particularly a wedge surface, for the tool holders of a magazine is arranged in the range of motion of the tool holders at a point associated with the tool carrier of the machine. If the magazine is displaced angularly, the tool holder coming into the range of the tool carrier of the machine is turned automatically about its pivot by the stop element toward the displacement range of the workpiece, that is, in the case of a lower magazine, it is swung upwardly. The stop element is so dimensioned and arranged that, when a suitable angular position for the transfer or take-over of a tool is reached, the tool has just reached the proper height. If the holder, with the tool arranged thereon, is further angularly displaced, it is lowered automatically. This lowering can also be effected over an inclined surface.

An object of the invention is to provide an improved machine tool, particularly a stamping or nibbling machine, where contact of the workpiece with a tool in the magazine is avoided while the tool to be exchanged assumes the position necessary for the exchange.

Another object of the invention is to provide such a machine tool in which all tools in each magazine, except the tool to be exchanged, are in a plane completely spaced from the displacement plane of the workpiece.

A further object of the invention is to provide such a machine tool including a device operable to move the tool to be exchanged, relative to its magazine, into a tool transfer plane for movement into a working position in a tool carrier and vice versa.

For an understanding of the principles of the invention, reference is made to the following description of a typical embodiment thereof as illustrated in the accompanying drawings.

BRIEF DESCRIPTION OF THE DRAWINGS

In the Drawings:

FIG. 2 is a top plan view of FIG. 1, partly broken away.

DESCRIPTION OF THE PREFERRED EMBODIMENT

Figure 1:
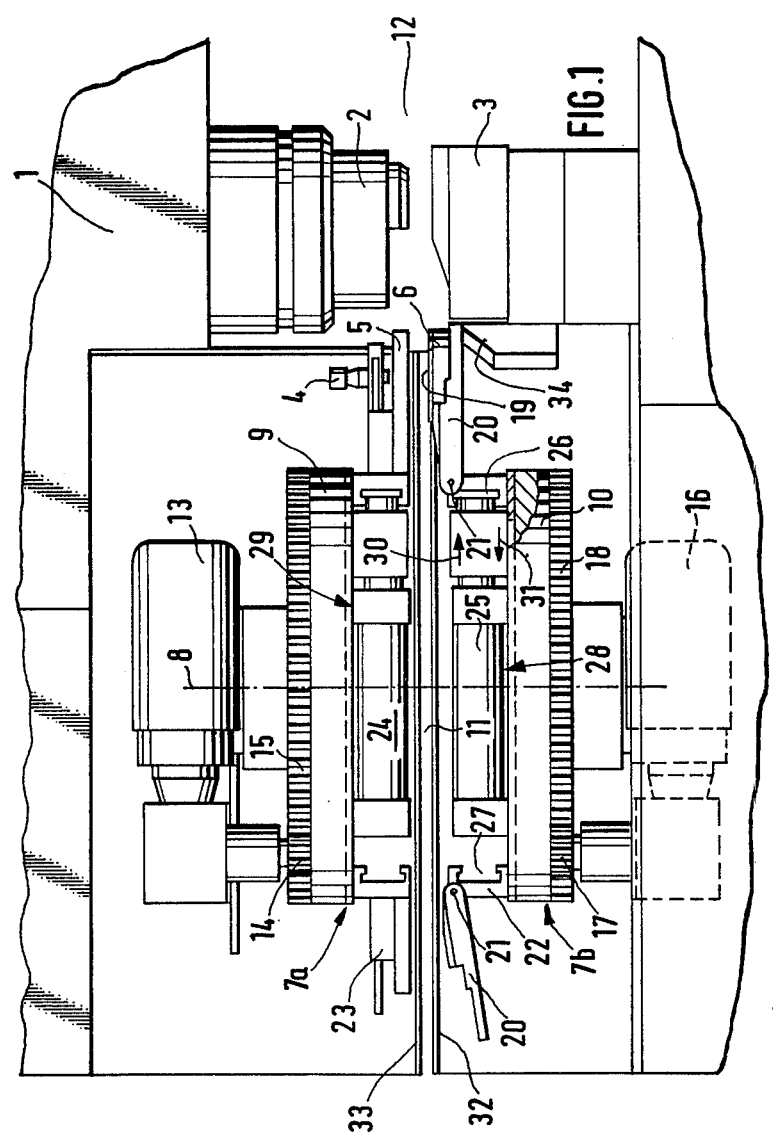
FIG. 1 is a side elevational view of a machine tool in the form of a nibbling machine, and of the associated tool magazine, partly broken away.

Referring to the drawings, a stamping machine 1 has an upper tool carrier 2, for a male die, and for a pressure pad 5, if the latter is necessary, as well as a lower tool carrier 3 for locking of a female die 6. A number of male dies 4 are inserted into an upper tool magazine 7a, and an equal number of female dies 6, are inserted into a lower tool magazine 7b, with the stamping machine 1 being able to work selectively with the inserted male and female dies. Upper tool magazine 7a includes an upper plate 9 rotatable about a vertical axis 8, and lower tool magazine 7b has a lower plate 10 also rotatable about axis 8, the magazine 7a and 7b being spaced vertically from each other to form an interval or space 11 therebetween. Interval or space 11 constitutes an extension of the throat area 12 of the stamping or nibbling machine 1, and the workpiece to be machined can extend at least partly laterally into this interval or space 11.

Both plates 9 and 10 are rotatably mounted, with plate 9 being rotatably by means of a motor 13, a pinion 14 driven by the motor, and a gear 15 meshing with pinion 14 and fixed to rotate with the upper plate, so that each male die arranged on plate 9 can be brought into position for movement into or out of upper tool carrier 2. In a similar manner, lower plate 10 is turned by means of a motor 16, a pinion 17 driven by the motor, and a gear ring 18 meshing with pinion 17, the lower plate 10 being rotated in synchronism with upper plate 9. Thus, each of the female dies 6 on lower plate 10 can be brought into a suitable transfer or take-over position relative to lower tool carrier 3.

Stamping or nibbling machine 1 is so designed that tool carriers 2 and 3 assume a given position, in a vertical sense, in the tool exchange position. In order to move the tool, for example the male die or the female die, only laterally, but not vertically, it is necessary that both the male die and the female die assume the proper position, in a vertical sense, already in the associated magazine 7a or 7b. In known stamping and nibbling machines, the conditions are such that the female dies extend up to the displacement plane or range of the workpiece when assuming the position, in a vertical sense, necessary for the exchange, and the workpiece, which has not been shown, consequently bears on the top side or surface 19 of the female dies 6. Thus, the danger that the workpiece will be hooked, during its feeding, can not be prevented, while leading, on the other hand, to fouling of female die 6. Also, the workpiece itself can be scratched, in an undesired manner, by the female die 6.

In order to prevent these possibilities, in accordance with the present invention, all tools of the tool magazine or magazines are arranged completely below or completely above the displacement plane or range of the workpiece, with the exception of the tool or tools which are to be exchanged, that is, which are aligned directly with the respective tool carriers of machine 1. Only the upper and lower tools which are to be exchanged extend directly down or up, respectively, to the displacement range or plane of the workpiece, and the workpiece bears on the lower tool only after the latter has been locked in the tool carrier 3.

Since all those tools which are not in the exchange position are thus arranged either above or below the displacement range of the workpiece, and thus have at least a small spacing from the latter, they must be brought to the proper level into the rotary or displacement position suitable for exchange of tools from the tool carrier, by means of a lifting or lowering device.

In the illustrated embodiment of the invention, the lifting device is automatic. Thus, it consists of a stationary stop member 34 associated with lower tool carrier 3. The female die 6, that is, the one part of each stamping tool, is arranged on a tool holder 20 designed as a flap pivotal about a horizontal axis, and which extends from lower plate 10 of tool magazine 7b radially outwardly. The pivots of these tool holders 20 are indicated at 21, and the tool holders 20 and their bearing blocks 22 are so designed that tool holders 20 assume a slightly downwardly inclined position. The inclined position is so selected that the female die 6 on each tool holder 20 is completely below the displacement range of the workpiece, which is defined by the space 11 and the throat area 12 of machine 1.

While the present invention will be described on the basis of a stamping machine which has an at least two-part tool, the principles of the invention are also applicable to machine tools having merely a one-part tool, for example, a drill, screw plate, milling cutter, etc. In the latter case, only one magazine tool naturally is provided, and which can be arranged either above or below the displacement range of the workpiece. The foregoing description, as well as the following considerations, apply also to machines having only a one-part tool.

This means that the pivotal tool holders 20 can also be secured on upper plate 9, and that they can assume, in their rest position, an outwardly inclined position which can be readily obtained, for example, by means of a tension spring. In the illustrated embodiment, however, pivotal tool holders are provided only on lower plate 10 of tool magazine 7b. However, this does not exclude the arrangement of pivotal tool holders 20 on upper plate 9 as well, or only on upper plate 9. As male dies 4 are spaced sufficiently from spacer interval 11, and thus from the displacement range or plane of the workpiece, in the illustrated embodiment, stationary tool holders 23 are provided for the upper tool parts such as the male dies 4. Each bearing block 22 is mounted for displacement, together with its tool holder 20 or 23, in a radial direction on its associated plate 9 or 10. The support is effected by means of a dovetail guide, which has not been shown.

The tool exchanger or tool changing device consists substantially of an upper hydraulic or pneumatic piston-cylinder device 24 for the upper tool parts, such as male dies 4, and a lower hydraulic or pneumatic piston-cylinder device 25 for the lower tool parts, such as the female dies 6. The pistons of these double action fluid-pressure actuators carry, at their ends, a collar 26. Additionally, bearing blocks 22 are formed with a T-groove whose dimensions are adapted to receive the collars 26.

During rotation of plates 9 and 10, the bearing blocks 22 which have just reached the position required for exchange of a tool, are coupled with the free piston end of a respective tool changing device 28 or 29. Thus, the bearing block 22 is pushed transversely to the drawing plane over the free piston end and the collar 26 thus engages the T-groove 27 of the associated bearing block. Consequently, a tension-proof and compression-proof coupling is obtained between a tool holder 20, arranged in the above-mentioned angular position, and the respective tool-changing device 28 or 29. If the cylinder 24 or 25 is now put under fluid pressure, the associated piston can perform a displacement movement in the direction of arrows 30 or 31, depending on the feed direction desired.

In the illustrated embodiment of the invention, it is provided that a lower tool holder 20, together with the associated female die 6, remains in lower tool carrier 3 of machine 1 during a stamping operation, for example. Thus, the form-lock connection with the tool changing device 28 is maintained. Upper tool holder 20, however, is retracted from upper tool carrier 2 during the stamping and after male die 4 has been disengaged from tool holder 20.

In accordance with another feature of the invention, all tools of each magazine, with the exception of the tool or tools in the tool exchange position, are covered by a plate. Since the tool, in the illustrated embodiment of the invention, consists of two parts, a lower cover plate 32 is provided for covering the lower tool parts and an upper cover plate 33 is provided for covering the upper tool parts, respectively, the female dies 6 and the male dies 4. In a circularly annular magazine, these cover plates also have a circularly annular form, for example, and can be provided, at their edges facing the respective tool carriers of the machine, with a recess for the tools to be exchanged. These plates defines the boundaries of the displacement plane of the workpiece and prevent engagement of the workpiece with tools in the mounting planes of the associated magazines.

While, in the foregoing description as well as in the following claims, a magazine is mentioned for the upper tools and a magazine also for the lower tools, it is not unusual to consider these two magazines as one magazine.

While a specific embodiment of the invention has been shown and described in detail to illustrate the application of the principles of the invention, it will be understood that the invention may be embodied otherwise without departing from such principles.

What is claimed is:

1. In a machine tool, particularly a stamping or nibbling machine, having work support means defining a displacement plane in which a workpiece is movable, at least one tool carrier an axially movable male die located in said tool carrier, at least one tool magazine lying in a plane which is spaced from the displacement plane of the workpiece and which is rotatable about an axis substantially parallel to the longitudinal axis of movement of said male die in said tool carrier, tool holders in each magazine and a tool exchanger operable to move a tool from each magazine into said tool carrier and vice versa, the improvement comprising, in combination, means, mounting all tool holders in each magazine, except the tool holder carrying the tool to be exchanged, in a mounting plane spaced sufficiently from the displacement plane of the workpiece to provide clearance for displacement of the workpiece in its displacement plane, during working thereof by a tool then in a working position in a tool carrier, without interference with tools in a non-working position in a magazine; a lifting device operable, responsive to rotation of each magazine into a position to engage and align a tool holder with a tool to be exchanged, to move the thus aligned tool holder, relative to its magazine, out of the mounting plane, with the workpiece remaining in its displacement plane, and into a working plane which includes the working position of a tool in a tool carrier; said tool changing device having means engageable with each lifted tool holder responsive to such rotation of the associated magazine, and said tool changing device further including means operable to shift the thus lifted tool holder linearly relative to the associated tool carrier; each lifted tool holder, responsive to further rotation of a magazine, being disengaged from said tool changing device, and said lifting device lowering the tool holder, with a tool extracted from a tool carrier and from the working position, relative to its associated magazine into the mounting plane of the other tools in its associated magazine.

2. In a machine tool, the improvement claimed in claim 1, including respective plates covering all the tools in each magazine except a tool in the tool exchange position, each plate defining a boundary of the displacement plane of the workpiece, providing a support surface for the workpiece and preventing engagement of the workpiece with tools in the mounting plane of the associated magazine.

3. In a machine tool, the improvement claimed in claim 1, including means mounting the tool holders of at least one magazine for pivoting between the mounting plane and the working position plane; these tool holders extending radially from their pivot axes outwardly relative to the axis of rotation of the magazine.

4. In a machine tool, the improvement claimed in claim 1, in which the axis of rotation of the magazines is vertical; the tools, during tool exchange, being moved horizontally to and from each magazine relatively to the associated tool carrier.

5. In a machine tool, the improvement claimed in claim 4, including upper and lower magazines in which the tool holders, in at least the lower magazine, are mounted therein for pivoting about horizontally oriented pivot axes; these tool holders extending radially outwardly from their respective pivot axes and from the axis of rotation of the magazine, and normally being inclined downwardly from their pivot axes.

6. In a machine tool, the improvement claimed in claim 5, in which said lifting device is arranged at a point associated with the tool carriers of the machine and operable to lift a tool holder, in the tool exchange position, into the working position plane.

7. In a machine tool, the improvement claimed in claim 6, in which said lifting device comprises a wedge surface operable to engage and lift a tool holder moving into the tool exchange position.

* * * * *